United States Patent
Sugihara et al.

(10) Patent No.: US 11,984,271 B2
(45) Date of Patent: May 14, 2024

(54) ELECTROLYTIC CAPACITOR HAVING REDUCED EQUIVALENT SERIES RESISTANCE

(71) Applicant: Panasonic Intellectual Property Management Co., Ltd., Osaka (JP)

(72) Inventors: Yukiyasu Sugihara, Aichi (JP); Norihiko Ogata, Saga (JP); Kazuhide Gotou, Saga (JP); Yuma Yano, Saga (JP); Yuki Ueda, Osaka (JP); Masayuki Hogiri, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/651,413

(22) Filed: Feb. 16, 2022

(65) Prior Publication Data

US 2022/0310328 A1 Sep. 29, 2022

(30) Foreign Application Priority Data

Mar. 25, 2021 (JP) ................................. 2021-051721

(51) Int. Cl.
*H01G 9/048* (2006.01)
*H01G 9/042* (2006.01)
*H01G 9/15* (2006.01)

(52) U.S. Cl.
CPC ........... *H01G 9/048* (2013.01); *H01G 9/0425* (2013.01); *H01G 9/15* (2013.01)

(58) Field of Classification Search
CPC ........ H01G 9/028; H01G 9/052; H01G 9/048; H01G 9/0425; H01G 9/012; H01G 9/15
See application file for complete search history.

(56) References Cited

U.S. PATENT DOCUMENTS

| | | | | |
|---|---|---|---|---|
| 3,971,970 A | * | 7/1976 | Voyles | H01G 9/012 29/25.03 |
| 6,086,642 A | * | 7/2000 | Fukaumi | H01G 11/56 29/25.03 |
| 6,660,188 B1 | * | 12/2003 | Ohata | H01G 11/48 528/424 |

(Continued)

FOREIGN PATENT DOCUMENTS

| | | | |
|---|---|---|---|
| EP | 0768686 A2 | * | 9/1996 |
| JP | 05234832 A | * | 9/1993 |

(Continued)

*Primary Examiner* — David M Sinclair
(74) *Attorney, Agent, or Firm* — Rimon P.C.

(57) ABSTRACT

An electrolytic capacitor includes an anode body having a porous structure, an anode lead having a sheet shape, a cathode layer, an anode lead frame electrically connected to the anode lead, and a cathode lead frame electrically connected to the cathode layer. The anode lead includes an embedded portion embedded in the anode body and a protrusion portion protruding to an outside of the anode body. The anode lead has a first main surface facing the cathode lead frame and a second main surface opposite to the first main surface. The anode lead is located between a center of the anode body and an end face of the anode body in a first direction in which the first main surface faces the cathode lead frame. The end face of the anode body is positioned at a side close to the cathode lead frame.

7 Claims, 3 Drawing Sheets

(56) References Cited

U.S. PATENT DOCUMENTS

| | | | | |
|---|---|---|---|---|
| 2007/0033783 A1* | 2/2007 | Takeda | ............ | H01G 9/15 |
| | | | | 29/25.03 |
| 2007/0159770 A1* | 7/2007 | Kuriyama | ............ | H01G 2/065 |
| | | | | 361/528 |
| 2008/0037201 A1* | 2/2008 | Kuriyama | ............ | H01G 2/065 |
| | | | | 29/25.03 |
| 2008/0080124 A1* | 4/2008 | Kim | ............ | H01G 9/08 |
| | | | | 361/529 |
| 2009/0135551 A1* | 5/2009 | Nemoto | ............ | H01G 9/012 |
| | | | | 29/25.03 |
| 2012/0120553 A1* | 5/2012 | Han | ............ | H01G 9/15 |
| | | | | 29/25.03 |
| 2013/0321986 A1* | 12/2013 | Djebara | ............ | B23K 26/323 |
| | | | | 29/25.03 |
| 2014/0104756 A1* | 4/2014 | Jacobs | ............ | H01G 9/012 |
| | | | | 29/25.03 |
| 2015/0077905 A1* | 3/2015 | Shin | ............ | H05K 1/181 |
| | | | | 361/529 |
| 2017/0271087 A1* | 9/2017 | Aoyama | ............ | H01G 9/10 |
| 2022/0093343 A1* | 3/2022 | Cain | ............ | H01G 9/15 |

FOREIGN PATENT DOCUMENTS

| | | | | | |
|---|---|---|---|---|---|
| JP | 09237743 A | * | 9/1997 | | |
| JP | 2000-012387 | | 1/2000 | | |
| JP | 2003173938 A | * | 6/2003 | ............ | H01G 9/012 |
| JP | 2007088387 A | * | 4/2007 | ............ | H01G 11/56 |
| JP | 2010074049 A | * | 4/2010 | ............ | H01G 11/56 |
| KR | 20030060451 A | * | 7/2003 | | |

\* cited by examiner

ELECTROLYTIC CAPACITOR HAVING REDUCED EQUIVALENT SERIES RESISTANCE

BACKGROUND

1. Technical Field

The present disclosure relates to an electrolytic capacitor.

2. Description of the Related Art

In the related art, an electrode for an electrolytic capacitor including a molded body of valve metal powder and a foil-shaped lead attached to the molded body has been known (for example, Unexamined Japanese Patent Publication No. 2000-12387). According to Unexamined Japanese Patent Publication No. 2000-12387, it is possible to improve high-frequency characteristics of the electrode for an electrolytic capacitor by forming the lead in the foil shape.

SUMMARY

An electrolytic capacitor according to one aspect of the present disclosure includes an anode body having a porous structure, an anode lead having a sheet shape, a dielectric layer disposed on a surface of the anode body, a cathode layer covering at least a part of the dielectric layer, an anode lead frame electrically connected to the anode lead, and a cathode lead frame electrically connected to the cathode layer. The anode lead includes an embedded portion embedded in the anode body and a protrusion portion protruding to an outside of the anode body. The anode lead has a first main surface facing the cathode lead frame and a second main surface opposite to the first main surface. The anode lead is located between a center of the anode body and an end face of the anode body in a first direction in which the first main surface faces the cathode lead frame. The end face of the anode body is positioned at a side close to the cathode lead frame.

According to the present disclosure, the equivalent series resistance (ESR) of the electrolytic capacitor can be reduced.

DETAILED DESCRIPTIONS OF EMBODIMENT

Figure 1:
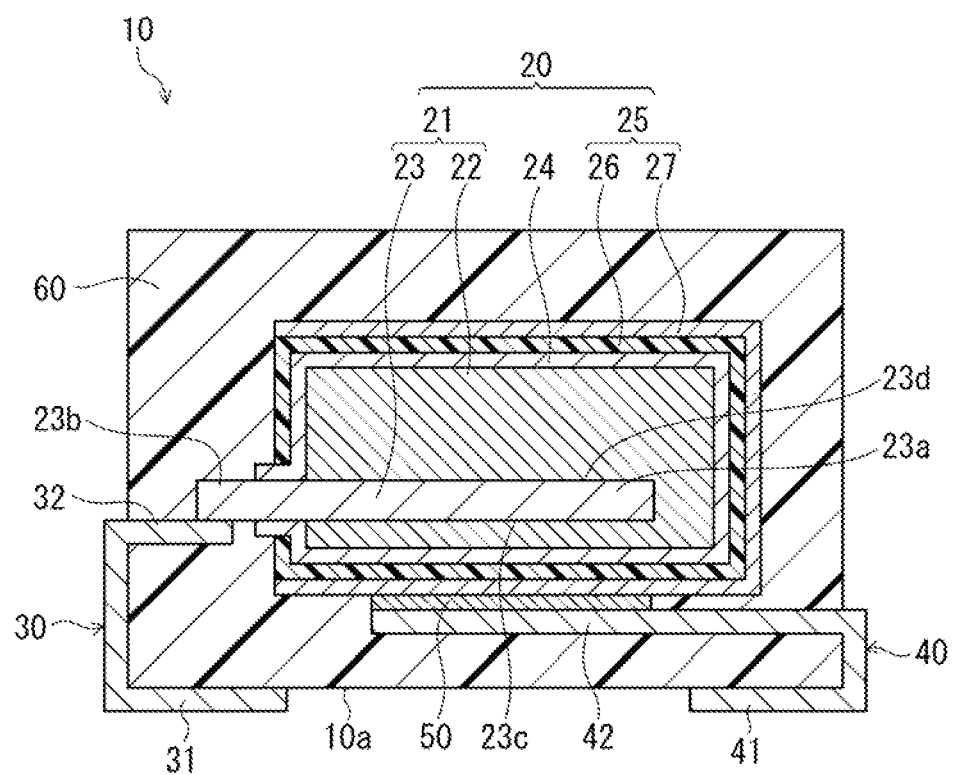
FIG. 1 is a sectional view schematically illustrating an example of an electrolytic capacitor according to the present disclosure.

An electrode for an electrolytic capacitor disclosed in Unexamined Japanese Patent Publication No. 2000-12387 has room for improvement in terms of reducing equivalent series resistance of the electrolytic capacitor. In such a situation, the present disclosure provides an electrolytic capacitor capable of reducing equivalent series resistance.

Hereinafter, an exemplary embodiment of an electrolytic capacitor according to the present disclosure will be described in conjunction with examples. Meanwhile, the present disclosure is not limited to the examples to be described below. In the following description, specific numerical values and materials may be provided as examples, but other numerical values and materials may be applied as long as the effect of the present disclosure can be obtained.

An electrolytic capacitor according to the present disclosure includes an anode body having a porous structure, an anode lead, a dielectric layer, a cathode layer, an anode lead frame, and a cathode lead frame. Specifically, the electrolytic capacitor includes an anode body having a porous structure, an anode lead having a sheet shape, a dielectric layer formed on a surface of the anode body, a cathode layer covering at least a part of the dielectric layer, an anode lead frame electrically connected to the anode lead, and a cathode lead frame electrically connected to the cathode layer. The anode lead includes an embedded portion embedded in the anode body and a protrusion portion protruding to an outside of the anode body. The anode lead has a sheet shape having a first main surface facing the cathode lead frame and a second main surface opposite to the first main surface. The first main surface faces a main surface of the cathode lead frame close to the cathode layer, and the cathode layer is interposed between both the facing main surfaces. In a direction (first direction) in which the first main surface faces the cathode lead frame, the anode lead is located between a center of the anode body and an end face of the anode body which is positioned at a side close to the cathode lead frame.

For example, the anode body is a porous sintered body having a substantially rectangular parallelepiped shape that is obtained through sintering of metal particles. The substantially rectangular parallelepiped shape of the anode body is a shape having three pairs of main surfaces (that is, six main surfaces) facing each other. The adjacent main surfaces intersect each other at an angle ranging from 80° to 100°, inclusive. Particles of valve metals such as titanium, tantalum, and niobium can be used as the metal particles. As the metal particles, a single kind may be used or two or more kinds may be used in combination. The metal particles may also be an alloy made of two or more kinds of metals. For example, a valve metal and an alloy containing silicon, vanadium, boron, or the like may be used. Alternatively, a compound containing a valve metal and a typical element such as nitrogen may be used. The alloy of the valve metal contains the valve metal as a main component and contains, for example, the valve metal in an amount of 50 atom % or more.

The anode lead is a sheet-shaped conductive member. The sheet shape can be referred to as a ribbon shape, a strip shape, or the like. The sheet-shaped anode lead may be, for example, a metal foil, a metal ribbon, or the like. A material of the anode lead is not particularly limited, and, for example, examples thereof include copper, aluminum, and an aluminum alloy other than the valve metal described above. The materials that constitute the anode body and the anode lead may be the same kind or different kinds. More specifically, the anode lead has the embedded portion embedded in the anode body and the protrusion portion protruding to the outside of the anode body. The first main surface of the anode lead faces the main surface of the cathode lead frame.

Most of the anode lead is the embedded portion. Since most of the first main surface and the second main surface are allocated to the embedded portion, a connection interface between the embedded portion and the anode body becomes very large. Since the first main surface faces the main surface of the cathode lead frame, the connection interface between the embedded portion and the anode body overlaps a connection interface between the cathode layer and the cathode lead frame in a large area. That is, a very thick conductive path from the embedded portion to the cathode lead frame is secured. The thick conductive path is formed to pass through the cathode layer from an anode portion via the dielectric layer. In the direction in which the first main surface of the anode lead faces the cathode lead frame, it is preferable that 50% or more of the first main surface of the anode lead overlap the cathode lead frame, and it is preferable that 70% or more of the first main surface, more preferably 90% or more of the first main surface overlap the cathode lead frame.

The dielectric layer is a layer formed on the surface of the anode body. For example, the dielectric layer is made of metal oxide. For example, a method for immersing the anode body in an anodizing solution to anodize the surface of the anode body, and a method for heating the anode body under an atmosphere containing oxygen can be exemplified as a method for forming the layer containing the metal oxide on the surface of the anode body. The dielectric layer is not limited to the layer containing the metal oxide described above, and may have insulation properties.

The cathode layer is a layer covering at least a part of the dielectric layer. The cathode layer has, for example, a layer containing conductive polymer, a carbon layer, and a metal paste layer formed on a surface of the carbon layer. The carbon layer contains a conductive carbon material such as graphite and resin. The metal paste layer contains, for example, metal particles (for example, silver) and resin. A configuration of the cathode layer is not limited thereto, but may be any configuration having a current collection function.

The anode lead frame is electrically connected to the anode lead. A material of the anode lead frame is not particularly limited as long as the material is electrochemically and chemically stable and has electric conductivity. For example, the anode lead frame may be formed by metal such as copper or nonmetal. The anode lead frame may be, for example, a bent metal flat plate or a metal sheet, but is not particularly limited. A thickness of the anode lead frame (that is, a metal flat plate or a metal sheet) (distance between the main surfaces of the anode lead frame) may range from 25 μm to 200 μm, inclusive, or 25 μm or less, or 100 μm or less from the viewpoint of height reduction.

One end portion of the anode lead frame may be joined to the protrusion portion of the anode lead by a conductive adhesive or solder, or may be joined to the protrusion portion of the anode lead by resistance welding or laser welding. The other end portion of the anode lead frame is exposed to the outside and disposed on the mounting surface of the electrolytic capacitor.

The cathode lead frame is electrically connected to the cathode layer. The material, shape, and thickness of the cathode lead frame may be the same as or different from those of the anode lead frame. That is, the cathode lead frame may be, for example, a bent metal flat plate or a metal sheet, but is not particularly limited. A thickness of the cathode lead frame (that is, a metal flat plate or a metal sheet) (a distance between main surfaces of the cathode lead frame) may range from 25 μm to 200 μm, inclusive, or from 25 μm to 100 μm, inclusive, from a viewpoint of height reduction. One end portion of the cathode lead frame may be joined to the cathode layer with a conductive adhesive or solder. The other end portion of the cathode lead frame is exposed to the outside and is disposed on a mounting surface of the electrolytic capacitor.

Here, when the anode lead has the sheet shape and the first main surface of the anode lead faces the cathode lead frame, the position of the anode lead remarkably influences the equivalent series resistance (ESR) of the electrolytic capacitor. Specifically, it is found that the ESR of the electrolytic capacitor can be remarkably reduced by disposing the anode lead between the center of the anode body and the end face of the anode body that is positioned at a side close to the cathode lead frame in the direction in which the first main surface of the anode lead faces the cathode lead frame. The end face of the anode body that is positioned at a side close to the cathode lead frame is a main surface among the six main surfaces of the anode body, which intersects the main surface from which the protrusion portion of the anode lead protrudes and faces the cathode lead frame most closely. According to such configuration, the anode lead is brought close to the cathode lead frame. As described above, in the configuration in which the first main surface of the anode lead and the cathode lead frame overlap each other in the large area as viewed in the direction in which the first main surface of the anode lead faces the cathode lead frame, the distance between the anode lead and the cathode lead frame remarkably influences the ESR.

Specifically, the anode lead is formed in the sheet shape, and thus, for example, the anode lead can be brought close to the cathode lead frame over a wider area as compared with a case where the anode lead is made of a wire having a round rod shape. Accordingly, the ESR of the electrolytic capacitor can be further reduced. When the anode lead is made of the wire, a connection interface between the wire and the anode body is small, and a resistance of a conductive path from the wire to the cathode lead frame is larger than that in the case where the sheet-shaped anode lead is used. In this case, the influence of the position of the anode lead on the ESR is small.

As described above, according to the present disclosure, the ESR of the electrolytic capacitor can be remarkably reduced by controlling the position of the anode lead as an effect peculiar to the case where the anode lead has the sheet shape and the first main surface of the anode lead faces the cathode lead frame.

Assuming that a length of the anode body in the direction (first direction) in which the first main surface of the anode lead faces the cathode lead frame is A [mm] and the distance between the first main surface of the anode lead and the end face of the anode body that is positioned at a side close to the cathode lead frame in the first direction is Ax [mm], $0.05 \leq Ax/(A/2) \leq 0.5$ may be satisfied. When $0.05 \leq Ax/(A/2)$ is satisfied, a cathode layer having a sufficient thickness is interposed between the embedded portion of the anode lead and the cathode lead frame. The cathode layer (most especially, the layer containing the conductive polymer) plays an important role in the formation of the conductive path. A cathode layer having a sufficient thickness is interposed, and thus, a thick conductive path can ensure a substantial current collection path.

As a result of intensive studies, the inventors of the present application have found that an ESR ratio of the electrolytic capacitor can be smaller than 1.0 when $0.05 \leq Ax/(A/2) \leq 0.5$ is satisfied. Here, the ESR ratio refers to a ratio of an ESR value to a reference value that is the ESR when the anode lead is located at the center of the anode body in the first direction. For example, when the reference value is 10 Ω and the ESR value of the electrolytic capacitor is 5Ω, the ESR ratio is 0.5 (=5/10). In other words, the electrolytic capacitor according to the present exemplary embodiment is an electrolytic capacitor capable of setting the ratio (ESR ratio) of the ESR to the reference value to be smaller than 1.0 when the reference value is the ESR of the electrolytic capacitor in a case where the anode lead is located at the center of the anode body in the first direction. Furthermore, the electrolytic capacitor according to the present exemplary embodiment is an electrolytic capacitor capable of setting the ESR ratio to be more preferably 0.98 or less. For example, Ax/(A/2) may be designed such that the ESR ratio is smaller than 1, preferably 0.98 or less, depending on the configuration of the cathode layer. Conversely, the configuration of the cathode layer or the like may be designed such that the ESR ratio is smaller than 1 and preferably 0.98 or less according to Ax/(A/2).

In the present specification, distance Ax between the first main surface of the anode lead and the end face of the anode body that is positioned at a side close to the cathode lead frame in the first direction is a distance Ax in a boundary region (so-called lead planting portion) between the embedded portion and the protrusion portion of the anode lead.

The cathode layer may have the layer containing the conductive polymer, and a conductivity of the layer containing the conductive polymer may range from 5 S/cm to 100 S/cm, inclusive. The layer containing the conductive polymer may cover at least a part of the dielectric layer. Examples of the conductive polymer include polypyrrole, polythiophene, polyfuran, polyaniline, polyacetylene, polyphenylene, polyparaphenylene vinylene, polyacene, polythiophene vinylene, polyfluorene, polyvinyl carb azole, polyvinyl phenol, polypyridine, or derivatives of these polymers. These polymers may be used alone or in combination of a plurality of polymers. Alternatively, the conductive polymer may be a copolymer from two or more kinds of monomers. The conductive polymer may be polythiophene, polyaniline, or polypyrrole in terms of superiority in electric conductivity. In particular, the conductive polymer may be polypyrrole in terms of superiority in water-repellency.

The layer containing the conductive polymer is formed through, for example, polymerization of a raw material monomer on the dielectric layer. Alternatively, the layer containing the conductive polymer may be formed by applying a liquid containing the conductive polymer to the dielectric layer. The layer containing the conductive polymer includes one layer or two or more layers containing the conductive polymer. When the layer containing the conductive polymer includes two or more layers, compositions, forming methods (polymerization methods), or the like of the conductive polymers used for the layers may be different from each other.

In the present specification, polypyrrole, polythiophene, polyfuran, polyaniline, and the like mean polymers having, as a basic skeleton, polypyrrole, polythiophene, polyfuran, polyaniline, and the like, respectively. Thus, each of polypyrrole, polythiophene, polyfuran, polyaniline, and the like each may also include a derivative. For example, polythiophene includes poly(3,4-ethylenedioxythiophene) and the like.

In order to improve electric conductivity of the conductive polymer, various dopants may be added to polymerization liquid for forming a conductive polymer, a conductive polymer solution, or dispersion liquid. The dopant is not particularly limited, but examples include 1,5-naphthalenedisulfonic acid, 1,6-naphthalenedisulfonic acid, 1-octanesulfonic acid, 1-naphthalenesulfonic acid, 2-naphthalenesulfonic acid, 2,6-naphthalenedisulfonic acid, 2,7-naphthalenedisulfonic acid, 2-methyl-5-isopropylbenzenesulfonic acid, 4-octylbenzenesulfonic acid, 4-nitrotoluene-2-sulfonic acid, m-nitrobenzenesulfonic acid, n-octylsulfonic acid, n-butanesulfonic acid, n-hexanesulfonic acid, o-nitrobenzenesulfonic acid, p-ethylbenzenesulfonic acid, trifluoromethanesulfonic acid, hydroxybenzenesulfonic acid, butylnaphthalenesulfonic acid, benzenesulfonic acid, polystyrenesulfonic acid, polyvinylsulfonic acid, and methanesulfonic acid, and derivatives of these dopants. Examples of the derivatives include metal salts such as lithium salts, potassium salts, and sodium salts, ammonium salts such as methylammonium salts, dimethylammonium salts, and trimethylammonium salts, piperidinium salts, pyrrolidinium salts, and pyrrolinium salts.

When the conductive polymer is dispersed in a dispersion medium in a particulate form, an average particle diameter D50 of the particles ranges, for example, from 0.01 μm to 0.5 μm, inclusive. When the average particle diameter D50 of the particles is within this range, the particles easily enter the anode body.

The embedded portion and the protrusion portion of the anode lead may be flush with each other. In other words, the anode lead may be flat as a whole.

Thickness T (distance between the first main surface and the second main surface) of the anode lead may ranges from 0.01 mm to 0.3 mm, inclusive.

Hereinafter, an example of the electrolytic capacitor according to the present disclosure will be specifically described with reference to the drawings. The above-described components can be applied to components of the electrolytic capacitor as the example to be described below. The components of the electrolytic capacitor as the example to be described below can be changed based on the above-described description. Matters to be described below may be applied to the above-described exemplary embodiment. Among the components of the electrolytic capacitor as the example to be described below, components that are not essential to the electrolytic capacitor according to the present disclosure may be omitted. The drawings to be illustrated below are considered schematic, and are not considered accurately reflect shapes, dimensions, numbers, or the like of actual members.

<Overall Configuration of Electrolytic Capacitor>

As illustrated in FIG. 1, electrolytic capacitor 10 includes capacitor element 20, anode lead frame 30, cathode lead frame 40, and exterior resin 60.

Capacitor element 20 includes anode portion 21, dielectric layer 24, and cathode layer 25. Anode portion 21 includes porous anode body 22 and sheet-shaped anode lead 23. Anode body 22 is a porous sintered body having a substantially rectangular parallelepiped shape, and dielectric layer 24 is formed on a surface thereof.

Anode lead 23 has embedded portion 23a embedded in anode body 22 and protrusion portion 23b protruding to an outside of anode body 22. Embedded portion 23a and protrusion portion 23b are flush with each other. Anode lead 23 has first main surface 23c facing cathode lead frame 40 and second main surface 23d on an opposite side. Thickness T of anode lead 23 may range from 0.01 mm to 0.3 mm, inclusive.

Cathode layer 25 includes electrolyte layer 26 disposed to cover at least a part of dielectric layer 24 (anode body 22), and conductive layer 27 formed on electrolyte layer 26. Conductive layer 27 includes, for example, a carbon layer formed on electrolyte layer 26 and a metal particle layer formed on the carbon layer. The metal particle layer is formed by using, for example, a metal paste. A conductivity of electrolyte layer 26 may range from 5 S/cm to 100 S/cm, inclusive, or may range from 5 S/cm to 70 S/cm, inclusive. Electrolyte layer 26 is an example of the layer containing the conductive polymer.

Anode lead frame 30 includes anode terminal portion 31 and lead connection portion 32. Anode terminal portion 31 is exposed on bottom surface 10a of electrolytic capacitor 10. Lead connection portion 32 is connected to anode terminal portion 31. Lead connection portion 32 is electrically connected to anode lead 23. That is, anode lead frame 30 is electrically connected to anode portion 21 of capacitor element 20. A shape of anode lead frame 30 illustrated in FIG. 1 is an example, and other shapes may be used as long as the shape functions as anode lead frame 30.

Cathode lead frame 40 includes cathode terminal portion 41 and connection portion 42. Cathode terminal portion 41 is exposed on bottom surface 10a of electrolytic capacitor 10. Connection portion 42 is connected to cathode terminal portion 41. Connection portion 42 is connected to cathode layer 25 via conductive member 50. That is, cathode lead frame 40 is electrically connected to cathode layer 25 of capacitor element 20. A shape of cathode lead frame 40 illustrated in FIG. 1 is an example, and other shapes may be used as long as the shape functions as cathode lead frame 40.

Exterior resin 60 is disposed around capacitor element 20 such that capacitor element 20 is not exposed on the surface of electrolytic capacitor 10. Exterior resin 60 insulates anode lead frame 30 from cathode lead frame 40. Examples of exterior resin 60 include epoxy resin, phenol resin, silicone resin, melamine resin, urea resin, alkyd resin, polyurethane, polyimide, unsaturated polyester, and the like. Exterior resin 60 may contain a substance (inorganic filler or the like) other than the resin.

<Position of Anode Lead and ESR Ratio>

Figure 2:
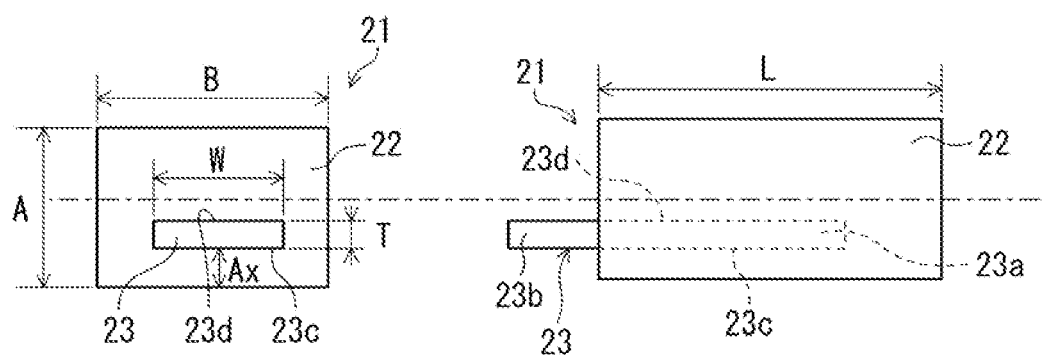
FIG. 2 illustrates two views of an anode body and an anode lead.

As illustrated in FIGS. 1 and 2, anode lead 23 is located between a center of anode body 22 and an end face of anode body 22 that is positioned at a side close to cathode lead frame 40 in a direction (first direction: vertical direction in FIG. 1) in which first main surface 23c faces cathode lead frame 40. In the present exemplary embodiment, when a length of anode body 22 in the first direction is A [mm] and a distance between first main surface 23c of anode lead 23 and the end face in the first direction is Ax [mm], $0.05 \leq Ax/(A/2) \leq 0.5$ is satisfied.

Figure 3:
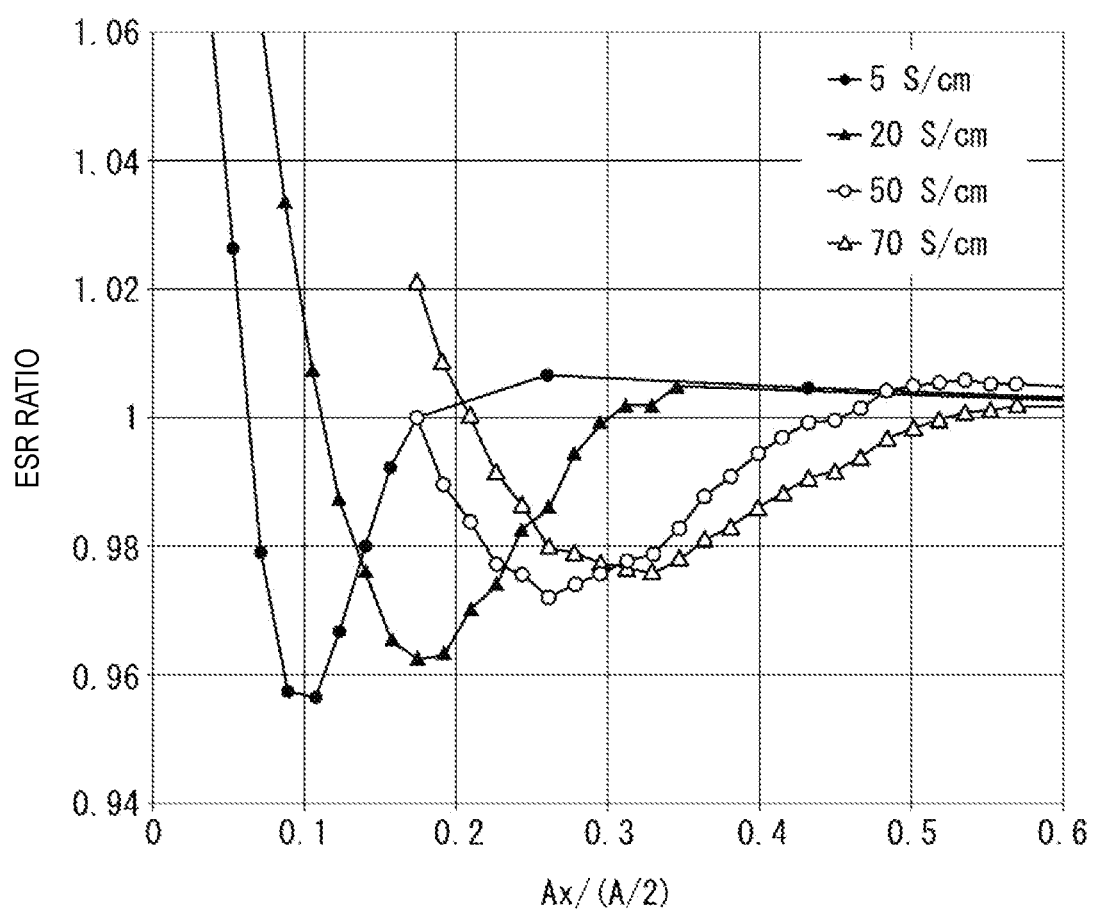
FIG. 3 is a graph illustrating a relationship between a position of the anode lead and an ESR ratio.

FIG. 3 is a graph illustrating evaluation results of a relationship between the position of anode lead 23, the conductivity of electrolyte layer 26, and the ESR ratio of electrolytic capacitor 10. In this graph, a horizontal axis represents the position (that is, $Ax/(A/2)$) of anode lead 23, and a vertical axis represents the ESR ratio of electrolytic capacitor 10. The evaluation results when the conductivity of electrolyte layer 26 is 5 S/cm, 20 S/cm, 50 S/cm, and 70 S/cm are represented. Here, $Ax/(A/2)$ becomes 0 when anode lead 23 is disposed at the end face of anode body 22, and $Ax/(A/2)$ becomes 1 when anode lead 23 is disposed at the center of anode body 22.

As evaluation conditions corresponding to FIG. 3, length L of anode body 22 was set to 4.40 mm, length (height) A of anode body 22 in the first direction was set to 1.73 mm, width B of anode body 22 was set to 2.57 mm, thickness T of anode lead 23 was set to 100 and width W of anode lead 23 was set to 2.0 mm (see FIG. 2 for the dimensions).

As can be seen from FIG. 3, when the conductivity of electrolyte layer 26 ranges from 5 S/cm to 70 S/cm, inclusive, there is a case that the ESR ratio of electrolytic capacitor 10 is smaller than 1 in the range of $0.05 \leq Ax/(A/2) \leq 0.5$. More specifically, the ESR ratio of electrolytic capacitor 10 is smaller than 1 in the range of $0.05 \leq Ax/(A/2) \leq 0.2$ when the conductivity of electrolyte layer 26 is 5 S/cm, in the range of $0.1 \leq Ax/(A/2) \leq 0.3$ when the conductivity of electrolyte layer 26 is 20 S/cm, in the range of $0.15 \leq Ax/(A/2) \leq 0.45$ when the conductivity of electrolyte layer 26 is 50 S/cm, and in the range of $0.2 \leq Ax/(A/2) \leq 0.5$ when the conductivity of electrolyte layer 26 is 70 S/cm, respectively. In other words, in the present exemplary embodiment, a value of $Ax/(A/2)$ is set within the range of $0.05 \leq Ax/(A/2) \leq 0.5$ such that the ESR ratio is smaller than 1 and the ESR ratio is preferably 0.98 or less. Although not illustrated, when the conductivity of electrolyte layer 26 is 100 S/cm, the ESR ratio of electrolytic capacitor 10 is smaller than 1 in the range of $0.25 \leq Ax/(A/2) \leq 0.5$.

As described above, in electrolytic capacitor 10 according to the present exemplary embodiment, the ESR ratio is smaller than 1. That is, the ESR of electrolytic capacitor 10 can be reduced more as compared with a configuration known in the related art (for example, Unexamined Japanese Patent Publication No. 2000-12387).

The present disclosure can be used for an electrolytic capacitor including an anode body that is a porous sintered body having a substantially rectangular parallelepiped shape that is obtained through sintering of metal particles, and a sheet-shaped anode lead.

What is claimed is:

1. An electrolytic capacitor comprising:
   an anode body having a porous structure;
   only a single anode lead including an embedded portion embedded in the anode body and only a single protrusion portion protruding to an outside of the anode body, the single protrusion portion protruding from one face of the anode body, the single anode lead having a sheet shape;
   a dielectric layer disposed on a surface of the anode body;
   a cathode layer covering at least a part of the dielectric layer;
   an anode lead frame electrically connected to the single anode lead; and
   a cathode lead frame electrically connected to the cathode layer, wherein:
   the single anode lead has a first main surface facing the cathode lead frame and a second main surface opposite to the first main surface,
   the single anode lead is located between a center of the anode body and an end face of the anode body in a first direction in which the first main surface faces the cathode lead frame, the end face of the anode body being positioned at a side close to the cathode lead frame,
   the anode body only embeds the embedded portion of the single anode lead,
   in viewing in the direction in which the first main surface of the single anode lead faces the cathode lead frame, more than 50% of the first main surface of the single anode lead overlap a connection interface between the cathode layer and the cathode lead frame,
   the cathode layer includes a layer containing a conductive polymer,
   a conductivity of the layer containing the conductive polymer ranges from 5 S/cm to 20 S/cm, inclusive, and $0.05 \leq Ax/(A/2) < 0.3$ is satisfied,
   where A [mm] is a length of the anode body in the first direction, and Ax [mm] is a distance between the first main surface of the single anode lead and the end face in the first direction.

2. The electrolytic capacitor according to claim 1, wherein the embedded portion and the single protrusion portion of the single anode lead are flush with each other.

3. The electrolytic capacitor according to claim 1, wherein a thickness T of the single anode lead ranges from 0.01 mm to 0.3 mm, inclusive.

4. The electrolytic capacitor according to claim 1, wherein a ratio of equivalent series resistance of the electrolytic capacitor to a reference value is smaller than 1.0, the reference value being a value of the equivalent series resistance when the single anode lead is located at the center of the anode body in the first direction.

5. The electrolytic capacitor according to claim 1, wherein in viewing in the direction in which the first main surface of the single anode lead faces the cathode lead frame, 70% or more of the first main surface of the single anode lead overlap the connection interface between the cathode layer and the cathode lead frame.

6. The electrolytic capacitor according to claim 1, wherein in viewing in the direction in which the first main surface of the single anode lead faces the cathode lead frame, 90% or more of the first main surface of the single anode lead overlap the connection interface between the cathode layer and the cathode lead frame.

7. The electrolytic capacitor according to claim 1, wherein $0.1 \leq Ax/(A/2) \leq 0.2$ is satisfied.

* * * * *